(12) United States Patent
Rabinovitch

(10) Patent No.: US 11,093,223 B2
(45) Date of Patent: Aug. 17, 2021

(54) AUTOMATICALLY CONVERTING A PROGRAM WRITTEN IN A PROCEDURAL PROGRAMMING LANGUAGE INTO A DATAFLOW GRAPH AND RELATED SYSTEMS AND METHODS

(71) Applicant: Ab Initio Technology LLC, Lexington, MA (US)

(72) Inventor: Yuri Gennady Rabinovitch, Riverwoods, IL (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 16/515,995

(22) Filed: Jul. 18, 2019

(65) Prior Publication Data
US 2021/0019126 A1    Jan. 21, 2021

(51) Int. Cl.
*G06F 8/40*    (2018.01)

(52) U.S. Cl.
CPC ..................................... *G06F 8/40* (2013.01)

(58) Field of Classification Search
CPC . G06F 8/40; G06F 16/435; G06F 8/34; G06F 8/30; G06F 8/70
See application file for complete search history.

(56) References Cited

U.S. PATENT DOCUMENTS

| 4,586,137 A | 4/1986 | Frost, Jr. et al. |
| 5,088,034 A | 2/1992 | Ihara et al. |

(Continued)

FOREIGN PATENT DOCUMENTS

| CA | 2259362 A1 | 1/1998 |
| CN | 1541363 A | 10/2004 |

(Continued)

OTHER PUBLICATIONS

Australian Examiner's Report for Australian Application No. 2016220252 dated Jun. 30, 2020.

(Continued)

*Primary Examiner* — Wei Y Zhen
*Assistant Examiner* — Amir Soltanzadeh
(74) *Attorney, Agent, or Firm* — Wolf, Greenfield & Sacks, P.C.

(57) ABSTRACT

Techniques are described for increasing the functionality of a data processing system via a computer-executed tool that converts programs, written in a procedural language, into components that may be executed as a dataflow graph. The dataflow graph generated from a program written in a procedural programming language may support various forms of parallelism, such as pipeline parallelism and/or component parallelism. In some embodiments, parallelism may be achieved by parsing the program based on a grammar and identifying control flow relationships between data operations performed by the program. In particular, types of dataflow graph components may be identified, according to the grammar, as corresponding to particular data operations (or groups of data operations) of the program. A dataflow graph may be generated to comprise the identified components, which may be connected together with flows in an order according to the identified control flow relationships between data operations.

21 Claims, 10 Drawing Sheets

(56) References Cited

U.S. PATENT DOCUMENTS

| | | | |
|---|---|---|---|
| 5,151,991 A | 9/1992 | Iwasawa et al. | |
| 5,210,030 A | 5/1993 | Petuch et al. | |
| 5,313,584 A | 5/1994 | Tickner et al. | |
| 5,347,639 A | 9/1994 | Rechtschaffen et al. | |
| 5,367,619 A | 11/1994 | Dipaolo et al. | |
| 5,369,774 A * | 11/1994 | Hatakeyama | G06F 9/4494 |
| | | | 712/25 |
| 5,446,915 A | 8/1995 | Pierce | |
| 5,475,842 A | 12/1995 | Gilbert et al. | |
| 5,475,843 A | 12/1995 | Halviatti et al. | |
| 5,495,605 A | 2/1996 | Cadot | |
| 5,546,576 A | 8/1996 | Cochrane et al. | |
| 5,574,898 A | 11/1996 | Leblang et al. | |
| 5,588,150 A | 12/1996 | Lin et al. | |
| 5,600,833 A | 2/1997 | Senn et al. | |
| 5,619,692 A | 4/1997 | Malkemus et al. | |
| 5,632,022 A | 5/1997 | Warren et al. | |
| 5,678,044 A | 10/1997 | Pastilha et al. | |
| 5,682,537 A | 10/1997 | Davies et al. | |
| 5,706,509 A | 1/1998 | Man-Hak Tso | |
| 5,712,971 A | 1/1998 | Stanfill et al. | |
| 5,734,886 A | 3/1998 | Grosse et al. | |
| 5,752,196 A | 5/1998 | Ahvenainen et al. | |
| 5,768,564 A | 6/1998 | Andrews et al. | |
| 5,799,149 A | 8/1998 | Brenner et al. | |
| 5,819,021 A | 10/1998 | Stanfill et al. | |
| 5,860,009 A | 1/1999 | Uchihira et al. | |
| 5,870,743 A | 2/1999 | Cohen et al. | |
| 5,901,353 A | 5/1999 | Pentikäinen | |
| 5,909,681 A | 6/1999 | Passera et al. | |
| 5,930,723 A | 7/1999 | Heiskari et al. | |
| 5,935,216 A | 8/1999 | Benner et al. | |
| 5,956,074 A | 9/1999 | Sclafani | |
| 5,959,704 A | 9/1999 | Gautam et al. | |
| 5,966,072 A | 10/1999 | Stanfill et al. | |
| 5,978,044 A | 11/1999 | Choi | |
| 5,983,228 A | 11/1999 | Kobayashi et al. | |
| 5,999,729 A | 12/1999 | Tabloski, Jr. et al. | |
| 6,031,993 A | 2/2000 | Andrews et al. | |
| 6,077,313 A | 6/2000 | Ruf | |
| 6,182,061 B1 | 1/2001 | Matsuzawa et al. | |
| 6,205,465 B1 | 3/2001 | Schoening et al. | |
| 6,253,371 B1 | 6/2001 | Iwasawa et al. | |
| 6,266,804 B1 | 7/2001 | Isman | |
| 6,295,518 B1 | 9/2001 | McLain et al. | |
| 6,311,265 B1 | 10/2001 | Beckerle et al. | |
| 6,330,008 B1 | 12/2001 | Razdow et al. | |
| 6,339,769 B1 | 1/2002 | Cochrane et al. | |
| 6,345,267 B1 | 2/2002 | Lohman et al. | |
| 6,378,126 B2 | 4/2002 | Tang | |
| 6,415,286 B1 | 7/2002 | Passera et al. | |
| 6,453,464 B1 | 9/2002 | Sullivan | |
| 6,615,203 B1 | 9/2003 | Lin et al. | |
| 6,625,593 B1 | 9/2003 | Leung et al. | |
| 6,694,306 B1 | 2/2004 | Nishizawa et al. | |
| 6,725,212 B2 | 4/2004 | Couch et al. | |
| 6,785,668 B1 | 8/2004 | Polo et al. | |
| 6,836,883 B1 | 12/2004 | Abrams et al. | |
| 6,877,000 B2 | 4/2005 | Gajda et al. | |
| 6,915,290 B2 | 7/2005 | Bestgen et al. | |
| 7,047,232 B1 * | 5/2006 | Serrano | G06F 8/456 |
| 7,080,062 B1 | 7/2006 | Leung et al. | |
| 7,111,019 B1 | 9/2006 | Nishizawa et al. | |
| 7,133,861 B2 | 11/2006 | Day et al. | |
| 7,164,422 B1 | 1/2007 | Wholey, III et al. | |
| 7,167,850 B2 | 1/2007 | Stanfill | |
| 7,249,120 B2 | 7/2007 | Bruno et al. | |
| 7,359,922 B2 | 4/2008 | Young-Lai et al. | |
| 7,428,532 B2 | 9/2008 | Styles | |
| 7,441,238 B2 | 10/2008 | Zatloukal | |
| 7,464,084 B2 | 12/2008 | Huang et al. | |
| 7,584,205 B2 | 9/2009 | Stanfill et al. | |
| 7,664,730 B2 | 2/2010 | Ziauddin et al. | |
| 7,747,795 B2 | 6/2010 | Wong | |
| 7,843,941 B2 | 11/2010 | Kawamura | |
| 7,853,523 B2 | 12/2010 | Krueger et al. | |
| 7,856,462 B2 | 12/2010 | Huang et al. | |
| 7,856,523 B2 | 12/2010 | Bittner, Jr. | |
| 7,870,556 B2 | 1/2011 | Wholey, III et al. | |
| 7,877,350 B2 | 1/2011 | Stanfill et al. | |
| 7,899,833 B2 | 3/2011 | Stevens et al. | |
| 7,917,463 B2 | 3/2011 | Dagum et al. | |
| 7,930,432 B2 | 4/2011 | Blaszczak | |
| 7,933,916 B2 | 4/2011 | Dolin et al. | |
| 7,945,562 B2 | 5/2011 | Ahmed et al. | |
| 7,953,891 B2 | 5/2011 | Blaszczak et al. | |
| 7,987,179 B2 | 7/2011 | Ma et al. | |
| 8,069,129 B2 | 11/2011 | Gould et al. | |
| 8,122,088 B2 | 2/2012 | Banatwala | |
| 8,204,903 B2 | 6/2012 | Bowers et al. | |
| 8,326,821 B2 | 12/2012 | Andrade et al. | |
| 8,392,398 B2 | 3/2013 | Aggarwal et al. | |
| 8,412,746 B2 | 4/2013 | Fox et al. | |
| 8,429,601 B2 | 4/2013 | Andersen | |
| 8,485,081 B2 | 7/2013 | Kim et al. | |
| 8,510,316 B2 | 8/2013 | Shimizu et al. | |
| 8,527,976 B2 | 9/2013 | Kahlon et al. | |
| 8,537,160 B2 | 9/2013 | Hargrove et al. | |
| 8,538,985 B2 | 9/2013 | Betawadkar-Norwood et al. | |
| 8,555,265 B2 | 10/2013 | Chambers et al. | |
| 8,572,236 B2 | 10/2013 | Sherb et al. | |
| 8,620,903 B2 | 12/2013 | Tatemura et al. | |
| 8,666,966 B2 | 3/2014 | Ranganathan et al. | |
| 8,688,683 B2 | 4/2014 | Simon et al. | |
| 8,782,081 B2 | 7/2014 | Guan et al. | |
| 8,805,818 B2 | 8/2014 | Zane et al. | |
| 8,850,574 B1 | 9/2014 | Ansel et al. | |
| 8,875,145 B2 | 10/2014 | Atterbury et al. | |
| 8,954,482 B2 | 2/2015 | Stanfill et al. | |
| 9,064,047 B2 | 6/2015 | Agarwal et al. | |
| 9,116,955 B2 | 8/2015 | Schechter et al. | |
| 9,128,983 B2 | 9/2015 | Cheng | |
| 9,135,301 B2 | 9/2015 | Petride et al. | |
| 9,177,022 B2 | 11/2015 | Taranov et al. | |
| 9,182,597 B2 | 11/2015 | Dominici et al. | |
| 9,251,225 B2 | 2/2016 | Stanfill | |
| 9,317,551 B1 | 4/2016 | Zander | |
| 9,348,866 B2 | 5/2016 | Tanaka et al. | |
| 9,424,315 B2 | 8/2016 | Chamdani et al. | |
| 9,477,778 B2 | 10/2016 | Hammerschmidt | |
| 9,633,104 B2 | 4/2017 | Wu et al. | |
| 9,665,620 B2 | 5/2017 | Schechter et al. | |
| 9,760,853 B2 | 9/2017 | Rose | |
| 9,891,901 B2 | 2/2018 | Beit-Aharon | |
| 10,282,181 B2 | 5/2019 | Beit-Aharon | |
| 10,289,396 B2 | 5/2019 | Beit-Aharon | |
| 10,417,281 B2 | 9/2019 | Schechter et al. | |
| 10,437,819 B2 | 10/2019 | Schechter et al. | |
| 2001/0011371 A1 | 8/2001 | Tang | |
| 2002/0120618 A1 | 8/2002 | Ushijima et al. | |
| 2003/0041052 A1 | 2/2003 | Gajda et al. | |
| 2003/0093410 A1 | 5/2003 | Couch et al. | |
| 2003/0120682 A1 | 6/2003 | Bestgen et al. | |
| 2005/0038788 A1 | 2/2005 | Dettinger et al. | |
| 2005/0091238 A1 | 4/2005 | Zane et al. | |
| 2005/0108209 A1 | 5/2005 | Beyer et al. | |
| 2005/0278152 A1 | 12/2005 | Blaszczak | |
| 2006/0048113 A1 * | 3/2006 | Ozone | G06F 8/433 |
| | | | 717/144 |
| 2006/0095466 A1 | 5/2006 | Stevens et al. | |
| 2006/0265362 A1 | 11/2006 | Bradford | |
| 2006/0294075 A1 | 12/2006 | Simic et al. | |
| 2006/0294087 A1 | 12/2006 | Mordvinov | |
| 2006/0294150 A1 | 12/2006 | Stanfill et al. | |
| 2007/0011668 A1 | 1/2007 | Wholey et al. | |
| 2007/0061318 A1 | 3/2007 | Azizi et al. | |
| 2007/0067274 A1 | 3/2007 | Han et al. | |
| 2007/0073853 A1 | 3/2007 | Azizi et al. | |
| 2007/0186036 A1 | 8/2007 | Bittner, Jr. | |
| 2007/0214179 A1 | 9/2007 | Hoang | |
| 2007/0002713 A1 | 11/2007 | Wholey et al. | |
| 2008/0049002 A1 | 2/2008 | Lin et al. | |
| 2008/0049022 A1 | 2/2008 | Sherb et al. | |
| 2008/0052299 A1 | 2/2008 | Shinke et al. | |

(56) References Cited

U.S. PATENT DOCUMENTS

| | | |
|---|---|---|
| 2008/0151749 A1 | 6/2008 | Kawamura |
| 2008/0256014 A1 | 10/2008 | Gould et al. |
| 2008/0270646 A1 | 10/2008 | Wong |
| 2009/0055370 A1 | 2/2009 | Dagum et al. |
| 2009/0083313 A1 | 3/2009 | Stanfill et al. |
| 2009/0106198 A1 | 4/2009 | Srinivasan et al. |
| 2009/0119576 A1* | 5/2009 | Pepper .............. G06F 16/24573 715/230 |
| 2009/0125887 A1 | 5/2009 | Kahlon et al. |
| 2009/0132474 A1 | 5/2009 | Ma et al. |
| 2009/0222404 A1 | 9/2009 | Dolin et al. |
| 2009/0225082 A1 | 9/2009 | Hargrove et al. |
| 2009/0254774 A1 | 10/2009 | Chamdani et al. |
| 2010/0005077 A1 | 1/2010 | Krishnamurthy et al. |
| 2010/0057695 A1 | 3/2010 | Kirovski et al. |
| 2010/0088674 A1* | 4/2010 | Della-Libera ......... G06F 40/205 717/114 |
| 2010/0121868 A1 | 5/2010 | Biannic et al. |
| 2010/0169887 A1 | 7/2010 | Waas |
| 2010/0211577 A1 | 8/2010 | Shimizu et al. |
| 2010/0211953 A1 | 8/2010 | Wakeling et al. |
| 2010/0241646 A1 | 9/2010 | Friedman et al. |
| 2010/0295833 A1 | 11/2010 | Nishio et al. |
| 2011/0010358 A1 | 1/2011 | Zane et al. |
| 2011/0017904 A1 | 1/2011 | Stutz |
| 2011/0029571 A1 | 2/2011 | Aggarwal et al. |
| 2011/0072319 A1 | 3/2011 | Agarwal et al. |
| 2011/0131199 A1 | 6/2011 | Simon et al. |
| 2011/0179014 A1 | 7/2011 | Schechter et al. |
| 2011/0179404 A1 | 7/2011 | Allen et al. |
| 2011/0208690 A1 | 8/2011 | Cushing et al. |
| 2011/0246448 A1 | 10/2011 | Tatemura et al. |
| 2011/0276789 A1 | 11/2011 | Chambers et al. |
| 2011/0302583 A1 | 12/2011 | Abadi et al. |
| 2012/0054173 A1 | 3/2012 | Andrade et al. |
| 2012/0095987 A1 | 4/2012 | Cheng |
| 2012/0246158 A1 | 9/2012 | Ke et al. |
| 2012/0284255 A1 | 11/2012 | Schechter et al. |
| 2012/0290620 A1 | 11/2012 | Guan et al. |
| 2013/0006965 A1 | 1/2013 | Barbas |
| 2013/0144867 A1 | 6/2013 | Tanaka et al. |
| 2013/0246864 A1 | 9/2013 | Ananthapadmanabh et al. |
| 2014/0019949 A1 | 1/2014 | Craymer |
| 2014/0032617 A1 | 1/2014 | Stanfill |
| 2014/0280037 A1 | 9/2014 | Petride et al. |
| 2014/0330827 A1 | 11/2014 | Wu et al. |
| 2015/0160934 A1 | 6/2015 | Beit-Aharon |
| 2015/0363230 A1* | 12/2015 | Kasahara .............. G06F 9/4881 718/106 |
| 2016/0140166 A1 | 5/2016 | Schechter et al. |
| 2016/0239582 A1 | 8/2016 | Schechter et al. |
| 2017/0228426 A1 | 8/2017 | Schechter et al. |
| 2018/0165077 A1 | 6/2018 | Beit-Aharon |
| 2018/0165078 A1 | 6/2018 | Beit-Aharon |
| 2019/0370290 A1 | 12/2019 | Schechter et al. |

FOREIGN PATENT DOCUMENTS

| | | |
|---|---|---|
| CN | 1756190 A | 4/2006 |
| CN | 1786950 A | 6/2006 |
| CN | 1790324 A | 6/2006 |
| CN | 101535990 A | 9/2009 |
| CN | 101548281 A | 9/2009 |
| CN | 101645074 A | 2/2010 |
| CN | 101809626 A | 8/2010 |
| CN | 101868792 A | 10/2010 |
| CN | 101971165 A | 2/2011 |
| CN | 102007476 A | 4/2011 |
| CN | 103608812 A | 2/2014 |
| EP | 0 421 408 A2 | 4/1991 |
| EP | 0 822 505 A2 | 2/1998 |
| EP | 2 110 761 A2 | 10/2009 |
| EP | 2 251 785 A1 | 11/2010 |
| EP | 3 287 896 A1 | 2/2018 |
| FI | 944887 A | 4/1996 |
| FI | 945495 A | 5/1996 |
| FI | 951270 A | 9/1996 |
| JP | H02-67682 A | 3/1990 |
| JP | H03-126169 A | 5/1991 |
| JP | H07-65032 A | 3/1995 |
| JP | H08-16429 A | 1/1996 |
| JP | H09-319757 A | 12/1997 |
| JP | H10-49409 A | 2/1998 |
| JP | H10-91494 A | 4/1998 |
| JP | H10-232875 A | 9/1998 |
| JP | H10-340276 A | 12/1998 |
| JP | H11-514116 A | 11/1999 |
| JP | 2000-148699 A | 5/2000 |
| JP | 2001-222453 A | 8/2001 |
| JP | 2001-273327 A | 10/2001 |
| JP | 2001-350656 A | 12/2001 |
| JP | 2002-259425 A | 9/2002 |
| JP | 2003-505766 A | 2/2003 |
| JP | 2003-099441 A | 4/2003 |
| JP | 2006-065846 A | 3/2006 |
| JP | 2006-236360 A | 9/2006 |
| JP | 2008-084028 A | 4/2008 |
| JP | 2009-181577 A | 8/2009 |
| JP | 2012-014502 A | 1/2012 |
| JP | 2013-080449 A | 5/2013 |
| JP | 2013-232165 A | 11/2013 |
| JP | 2014-519080 A | 8/2014 |
| WO | WO 96/12376 A1 | 4/1996 |
| WO | WO 96/16519 A1 | 5/1996 |
| WO | WO 96/29838 A1 | 9/1996 |
| WO | WO 97/23826 A1 | 7/1997 |
| WO | WO 2007/061430 A1 | 5/2007 |

OTHER PUBLICATIONS

Canadian Communication for Canadian Application No. 2,360,286 dated Jul. 27, 2005.
Chinese First Office Action with English translation for Chinese Application No. 201180014176.7 dated Jan. 7, 2015.
Chinese First Office Action with English translation for Chinese Application No. 201280021472.4 dated Jun. 21, 2016.
Chinese First Office Action with English translation for Chinese Application No. 201680011145.9 dated Sep. 22, 2020.
Chinese First Office Action with English translation for Chinese Application No. 201710812945.7 dated Apr. 3, 2020.
Summons to Attend Oral Proceedings for European Application No. 11702533.8, dated Nov. 5, 2018.
Communication pursuant to Article 94(3) EPC for European Application No. 12721999.6 dated Nov. 11, 2016.
Extended European Search Report for European Application No. 17202770.8 dated Mar. 22, 2018.
Communication pursuant to Article 94(3) EPC for European Application No. 17202770.8 dated Feb. 25, 2019.
Notice of Reasons for Rejection with English translation for Japanese Application No. 2000-594025 dated Mar. 29, 2005.
Notice of Reasons for Rejection with English translation for Japanese Application No. 2012-549105 dated Apr. 17, 2014.
Decision of Rejection with English translation for Japanese Application No. 2012-549105 dated Mar. 25, 2015.
Notice of Reasons for Rejection with English translation for Japanese Application No. 2014-509333 dated Mar. 24, 2016.
Notice of Reasons for Rejection with English translation for Japanese Application No. 2015-137280 dated Apr. 18, 2016.
Notice of Reasons for Rejection with English translation for Japanese Application No. 2016-167897 dated Jun. 16, 2017.
Notice of Reasons for Refusal with English translation for Japanese Application No. 2017-525332 dated Aug. 20, 2019.
Notice of Reasons for Refusal with English translation for Japanese Application No. 2017-543965 dated Jan. 30, 2020.
International Search Report & Written Opinion dated Jan. 4, 2011 for International Application No. PCT/US2000/00934.
International Search Report & Written Opinion dated Apr. 18, 2011 for International Application No. PCT/US2011/021260.

(56) References Cited

OTHER PUBLICATIONS

International Preliminary Report on Patentability dated May 24, 2012 for International Application No. PCT/US2011/021260.
International Search Report & Written Opinion dated Feb. 19, 2013 for International Application No. PCT/US2012/035762.
International Search Report & Written Opinion dated Mar. 6, 2015 for International Application No. PCT/US2014/069027.
International Preliminary Report on Patentability dated Aug. 31, 2017 for International Application No. PCT/US2016/018028.
International Search Report and Written Opinion dated Oct. 27, 2020 for International Application No. PCT/US2020/042574.
International Search Report and Written Opinion dated Apr. 10, 2018 for International Application No. SG11201705731T.
No Author Listed, Flat File Database. Wikipedia. http://en.wikipedia.org/w/index/.php?title+Flat_file_database&oldid_336589178.
No Author Listed, Forrester Research's Ellen Carney Names Compact Solutions Among "Hot Insurance Tech Companies-2009". Jun. 29, 2009. https://insurancenewsnet.com/oarticle/Forrester-Researchs-Ellen-Carney-Names-Compact-Solutions-Among-%E2%80%9CHot-Insurance-T-a-108002.
No Author Listed, Relational algebra. Wikipedia. Feb. 5, 2010. http/en.wikipedia.org/wiki/Relational_algebra.
No Author Listed, Torrent Technical White Paper, "Orchestrator for the SAS System—Delivering Scalability and Performance to SAS Applications," 1-30.
No Author Listed, Variable (programming). Wikipedia, XP05551470. Jun. 26, 2009. https://web.archive.org/web/20090626225908/https://en.wikipedia.org/wiki/Variable_(computer_science). Last accessed Oct. 12, 2018.
Afrati et al., Performance considerations on a random graph model for parallel processing. RAIRO-Theoretical Informatics and Applications. 1993;27(4):367-88.
Aho et al., Universality of data retrieval languages. Proceedings of the 6th ACM SIGACT-SIGPLAN symposium on Principles of programming languages. Jan. 1, 1979 ;110-19.
Apers et al., PRISMA/DB: A parallel, main memory relational DBMS. IEEE transactions on Knowledge and Data Engineering. Dec. 1992;4(6):541-54.
Baumstark et al., Extracting an explicitly data-parallel representation of image-processing programs. IEEE Computer Society Proceedings of the 10th Working Conference on Reverse Engineering. Nov. 13, 2003;24-34.
Bodin et al., A user level program transformation tool. Proceedings of the 12th international conference on Supercomputing. Jul. 13, 1998;180-87.
Boral et al., Prototyping Bubba, a highly parallel database system. IEEE Transactions on Knowledge & Data Engineering. Jan. 1, 1990;2(01):4-24.
Braun, Parallel program debugging using scalable visualization. IEEE Proceedings 1st International Conference on Algorithms and Architectures for Parallel Processing. Apr. 19, 1995:2;699-708.
Chamberlin et al., A history and evaluation of System R. Communications of the ACM. Oct. 1, 1981;24(10):632-46.
Cimitile et al., Incremental migration strategies: Data flow analysis for wrapping. IEEE Proceedings Fifth Working Conference on Reverse Engineering (Cat. No. 98TB100261) Oct. 12, 1998;59-68.
Cordy et al., Source transformation in software engineering using the TXL transformation system. Information and Software Technology. Oct. 1, 2002;44(13):827-37.
Cutler, Open COBOL 1.1 Programmer's Guide. Sep. 17, 2010;259 pages.
Dewitt et al., Parallel database systems: the future of high performance database systems. Communications of the ACM. Jun. 1, 1992;35(6):85-98.
Dewitt et al., Parallel Database Systems: the Future of High Performance Database Systems, vol. One. Bit. Dec. 1, 1993; 12:31 pages.
Dewitt et al., The Gamma database machine project. IEEE Transactions on Knowledge and Data Engineering. Mar. 1990;2(1):44-62.

Faust, Semiautomatic Translation of COBOL into HIBOL. Massachusetts Insti Tech Cambridge Lab for Computer Science; Feb. 1, 1981:123 pages.
Garcia-Molina et al., The Query Compiler. In: Database Systems The Complete Book Second Edition. Jun. 2008. Pearson Prentice Hall. Chapter 16:759-841.
Graefe et al., Encapsulation of parallelism and architecture-independence in extensible database query execution. IEEE Transactions on Software Engineering. Aug. 1993;19(8):749-64.
Graefe, Encapsulation of parallelism in the volcano query processing system. ACM SIGMOD Record. May 1, 1990;19(2):102-11.
Graefe, Volcano/spl minus/an extensible and parallel query evaluation system. IEEE Transactions on Knowledge and Data Engineering. Feb. 1994;6(1): 120-35.
Haas et al., Optimizing Queries Across Diverse Data Sources. Proceedings of the 23rd International Conference on Very Large Data Bases. Aug. 25, 1997:276-85.
Josifovski et al., Optimizing queries in distributed and composable mediators. IEEE Proceedings Fourth IFCIS International Conference on Cooperative Information Systems. CoopIS 99 (Cat. No. PR00384) Sep. 2, 1999:291-302.
Kossmann, The state of the art in distributed query processing. ACM Computing Surveys (CSUR). Dec. 1, 2000;32(4):422-69.
Levy et al., Querying Heterogeneous Information Sources Using Source Descriptions. Proceedings of the $22^{nd}$ VLDB Conference, Mumbai (Bombay), India. 1996:251-62.
Li et al., Load balancing problems for multiclass jobs in distributed/parallel computer systems. IEEE Transactions on Computers. Mar. 1998;47(3):322-32.
Mackert et al., R* Optimizer Validation and Performance Evaluation for Distributed Queries. Proceedings of the Twelfth International Conference on Very Large Data Bases, Kyoto. Aug. 1986:149-59.
Michael et al., Architectural Principles of the" Streamonas" Data Stream Management System and Performance Evaluation Based on the Linear Road Benchmark. IEEE 2008 International Conference on Computer Science and Software Engineering Dec. 12, 2008:4;643-46.
Nakayama, Realization of Virtual Data Integration Platform using PostgreSQL. Unisys Technology Review. Mar. 2012:25-37.
Ozsu et al., "Principles of Distributed Database Systems—Chapter 9—Multidatabase Query Processing", Principles of Distributed Database Systems: Third Edition, Springer New York, NY XP055267246, Mar. 2, 2011:294-334.
Pilecki, Optimizing SQL Server Query Performance. TechNet Magazine. 2007. 8 pages. https://technet.microsoft.com/en-US/library/2007.11sqiquery.aspx.
Rim et al., An efficient dynamic load balancing using the dimension exchange method for balancing of quantized loads on hypercube multiprocessors. IEEE Proceedings 13th International Parallel Processing Symposium and 10th Symposium on Parallel and Distributed Processing. IPPS/SPDP 1999. Apr. 12, 1999;708-12.
Schwartz et al., High Performance MySQL, Second Edition. O'Reilly. Jun. 2008; 710 pages.
Selinger et al., Access Path Selection in a Relational Database Management System. ACM. 1979:24-34.
Seshadri et al., Optimizing multiple queries in distributed data stream systems. IEEE 22nd International Conference on Data Engineering Workshops (ICDEW'06) Apr. 3, 2006;25-30.
Stanfill, Massively parallel information retrieval for wide area information servers. 1991 IEEE International Conference on Systems, Man and Cybernetics. Oct. 13, 1991;679-82.
Stanfill, The Mamage of Parallel Computing and Information Retrieval. IEE Colloquium on Parallel Techniques for Information Retrieval. Apr. 10, 1989;4 pages.
Stap, Data Flow Restructuring. Master Software Engineering, University of Amsterdam.Aug. 11, 2005:32 pages.
Tjan et al., A data-flow graphical user interface for querying a scientific database. Proceedings 1993 IEEE Symposium on Visual Languages. Aug. 24, 1993; 49-54.
Transaction History, U.S. Appl. No. 09/229,849, filed Jul. 11, 2013, (3 pages).

(56) References Cited

OTHER PUBLICATIONS

Transaction History, U.S. Appl. No. 09/229,849, filed Mar. 25, 2016 (3 pages).
Transaction History, U.S. Appl. No. 12/688,316, filed Jul. 11, 2013, (2 pages).
Transaction History, U.S. Appl. No. 12/688,316, filed Mar. 25, 2016 (3 pages).
Transaction History, U.S. Appl. No. 13/098,823, filed Mar. 25, 2016 (4 pages).
Transaction History, U.S. Appl. No. 13/098,823, filed Jul. 11, 2013, (2 pages).
Transaction History, U.S. Appl. No. 14/563,066, filed Mar. 25, 2016 (1 page).
Transaction History, U.S. Appl. No. 14/628,643, filed Mar. 25, 2016 (1 page).
Voruganti et al., An adaptive data-shipping architecture for client caching data management systems. Distributed and Parallel Databases. Mar. 1, 2004:15(2): 137-77.

\* cited by examiner

```
DATA DATASET_A;
  INFILE FILE_A;
  INPUT ORDER_NAME $10  EXT $4 CHANGE_FLAG $1;
  /* Form full order name */
  ORDER_FULL_NAME = ORDER_NAME || '_' || EXT || '_' || CHANGE_FLAG;
RUN;
```
    401a

```
DATA DATASET_B;
  INFILE FILE_B;
  INPUT ORDER_NAME $10  EXT $4 CHANGE_FLAG $1;
  /* Form full order name */
  ORDER_FULL_NAME = ORDER_NAME || '_' || EXT || '_' || CHANGE_FLAG;
RUN;
```
    401b

```
/* Merge datasets */
DATA DATASET_C;
  MERGE DATASET_A DATASET_B;
  BY ORDER_NAME;
RUN;
```
    401c

```
/* Output US records */
DATA DATASET_D;
  SET DATASET_C;
  IF SUBSTR( ORDER_FULL_NAME, 1, 2 ) = 'US' THEN
     OUTPUT;
RUN;
```
    401d

FIG. 4A

AUTOMATICALLY CONVERTING A PROGRAM WRITTEN IN A PROCEDURAL PROGRAMMING LANGUAGE INTO A DATAFLOW GRAPH AND RELATED SYSTEMS AND METHODS

BACKGROUND

Procedural programming is a paradigm in which programs are written as a series of explicit commands for a processor to carry out in order. Sub-sequences of commands can be grouped and called as desired from other parts of the program and thereby extend the range of commands the rest of the program can execute. These sub-sequences are sometimes referred to as subroutines, functions or subprograms, depending on the particular programming language being employed.

Dataflow programming, in contrast, emphasizes the flow of data through a sequence of operations through programs called dataflow graphs that define operations and how data flows between the operations. Dataflow graphs are generally configured to obtain data records from one or more sources, perform operations on the data records in a sequence, and produce some kind of output. Typically the parts of the dataflow graph that perform operations on data records are called components, and the connections between the components are called flows.

A difference between programs written in procedural languages and dataflow graphs is that multiple operations can be performed simultaneously in a dataflow graph because data records reaching earlier components in the dataflow graph ("upstream" components) can be operated on while other data records have already propagated to later components in the dataflow graph ("downstream" components). This phenomenon is a type of parallelism sometimes called pipeline parallelism. In this way, a dataflow graph can be thought of like a series of workers in an assembly line, with the components representing the workers, whereas a program written in a procedural language is more like a single worker completing a series of tasks, where each task is completed before the next is begun.

SUMMARY

According to some aspects, a non-transitory computer readable medium is provided comprising instructions that, when executed by at least one processor, perform a method of converting a program into a dataflow graph, wherein the program comprises data operations and a control flow indicating a sequence of execution of the data operations, the method comprising analyzing the program using the at least one processor and using a grammar stored by the at least one computer readable medium, said analyzing comprising identifying, based on the grammar, a plurality of sequential steps of the program, wherein each step of the plurality of steps comprises one or more data operations of the program, generating a catalog storing control flow relationships between steps of the plurality of identified steps of the program, for each of the identified plurality of steps of the program, based on data operations of the step and based on the grammar, identifying one of a plurality of dataflow graph component types as corresponding to the step, thereby identifying a plurality of dataflow graph components each corresponding to a respective step of the plurality of steps of the program, and configuring the plurality of dataflow graph components based on respective corresponding steps of the plurality of steps of the program and based on the grammar, thereby producing a plurality of configured dataflow graph components, and generating, using the at least one processor, a dataflow graph comprising the plurality of configured dataflow graph components, and one or more flows representing flows of data records between the one or more dataflow graph components, wherein the one or more dataflow graph components are connected via the one or more flows in an order according to the generated catalog.

According to some aspects, a computer-implemented method is provided of automatically converting a program into a dataflow graph, wherein the program comprises data operations and a control flow indicating a sequence of execution of the data operations, the method comprising analyzing the program using the at least one processor and using a grammar stored by the at least one computer readable medium, said analyzing comprising identifying, based on the grammar, a plurality of sequential steps of the program, wherein each step of the plurality of steps comprises one or more data operations of the program, generating a catalog storing control flow relationships between steps of the plurality of identified steps of the program, for each of the identified plurality of steps of the program, based on data operations of the step and based on the grammar, identifying one of a plurality of dataflow graph component types as corresponding to the step, thereby identifying a plurality of dataflow graph components each corresponding to a respective step of the plurality of steps of the program, and configuring the plurality of dataflow graph components based on respective corresponding steps of the plurality of steps of the program and based on the grammar, thereby producing a plurality of configured dataflow graph components, and generating, using the at least one processor, a dataflow graph comprising the plurality of configured dataflow graph components, and one or more flows representing flows of data records between the one or more dataflow graph components, wherein the one or more dataflow graph components are connected via the one or more flows in an order according to the generated catalog.

According to some aspects, a system for automatically converting a program into a dataflow graph is provided, wherein the program comprises data operations and a control flow indicating a sequence of execution of the data operations, the system comprising means for analyzing the program using the at least one processor and using a grammar stored by the at least one computer readable medium, said analyzing comprising identifying, based on the grammar, a plurality of sequential steps of the program, wherein each step of the plurality of steps comprises one or more data operations of the program, generating a catalog storing control flow relationships between steps of the plurality of identified steps of the program, for each of the identified plurality of steps of the program, based on data operations of the step and based on the grammar, identifying one of a plurality of dataflow graph component types as corresponding to the step, thereby identifying a plurality of dataflow graph components each corresponding to a respective step of the plurality of steps of the program, and configuring the plurality of dataflow graph components based on respective corresponding steps of the plurality of steps of the program and based on the grammar, thereby producing a plurality of configured dataflow graph components, and means for generating a dataflow graph, the dataflow graph comprising the plurality of configured dataflow graph components, and one or more flows representing flows of data records between the one or more dataflow graph components, wherein the one or more dataflow graph components are connected via the one or more flows in an order according to the generated catalog.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 4A is an illustrative SAS program, according to some embodiments;

DETAILED DESCRIPTION

Figure 1:
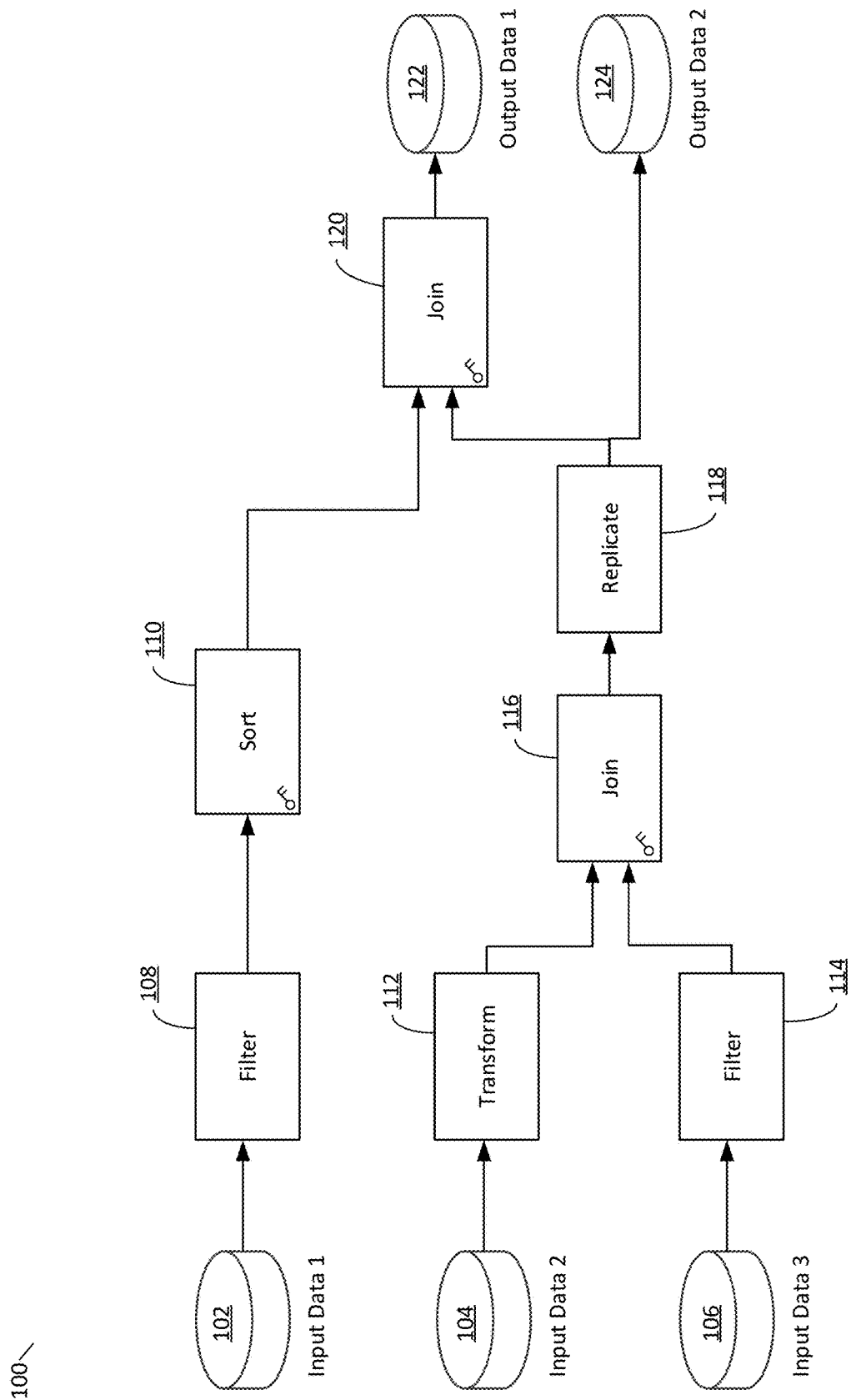
FIG. 1 depicts an illustrative dataflow graph, according to some embodiments.

The inventors have recognized and appreciated that the functionality of a data processing system may be increased via a computer-executed tool that converts programs, written in a procedural language, into components that may be executed as a dataflow graph. In particular, the computer-executed tool may identify types of dataflow graph components as corresponding to portions of a program so that the behavior of each portion may be reproduced by a suitable portion of a dataflow graph. In some embodiments, the graph generated from a program written in a procedural programming language may support various forms of parallelism, such as pipeline parallelism and/or component parallelism, even though the program written in the procedural language may have lacked such parallelism. In some embodiments, parallelism may be achieved by parsing the program based on a grammar and identifying control flow relationships between data operations performed by the program. Furthermore, types of dataflow graph components may be identified using the grammar as corresponding to particular data operations (or groups of data operations) of the program. A dataflow graph may be generated to comprise the identified components, which may be connected together with flows in an order according to the identified control flow relationships between data operations.

There can be a number of benefits to processing data using dataflow programming compared with procedural programming. In particular, as discussed above, a dataflow graph may naturally provide for parallel processing through pipeline parallelism, making dataflow programming a natural choice for processing datasets where particular operations are repeated on many pieces of data, such as data records of a dataset. An additional type of parallelism afforded by dataflow graphs is component parallelism, which is produced when different branches of the dataflow graph are operating at the same time. For instance, data records from a single data source may be output along different flows, and different operations performed along the different branches at the same time.

Despite the advantages that can be afforded by dataflow graphs, some organizations (e.g., businesses) may nonetheless rely on programs written in a procedural language for data processing. In some cases, an organization may use dataflow graphs in part whilst still leveraging programs written in a procedural language. This approach typically involves executing dataflow graphs instead of the former programs written in the procedural language whilst including components in the dataflow graphs that execute, external to the dataflow graph, some of the code of the programs written in the procedural language. In this manner, the dataflow graph is being executed as a "wrapper" of sorts, and while the dataflow graph is ultimately the program that is executed by the system, a great deal of the functionality of the program may still be executed externally by the procedural language.

One drawback with this approach may be that the dataflow graph language may have no ability to understand what is happening within a component that executes external code written in a procedural language. Another useful feature of dataflow graphs is the ability to trace data lineage through a single dataflow graphs or through multiple dataflow graphs to gain an understanding of where data is coming from and going to within the operations of an organization. A component that executes external code may, however, be akin to a "black box" to the dataflow graph software with respect to data lineage, because the dataflow graph software may not be able to trace data lineage through the component since the operations the component performs are unknown to the software. Moreover, this approach may inhibit pipeline parallelism because the external code may need to be fully executed before downstream components may execute.

As discussed above, the inventor has recognized and appreciated that the functionality of a data processing system may be increased via a computer-executed tool that converts programs, written in a procedural language, into components that may be executed as a dataflow graph. These techniques may be applied to generate native dataflow graph code throughout the generated dataflow graph so that data lineage can be tracked through the dataflow graph. The natural efficiency benefits of dataflow graphs, such as component parallelism and/or pipeline parallelism as discussed above, may be naturally provided in a generated dataflow graph. The inventor has further recognized and appreciated techniques for implementing such a tool based on a grammar, as discussed further below.

According to some embodiments, a system converting a program written in a procedural language into a dataflow graph may execute a parser to parse the text of the program. In some embodiments, such parsing may identify operations performed on data by the program and may further identify the type of such operations. Based on the type of data operation being performed by the program, a particular type of dataflow graph component able to perform the same operation may be identified by accessing a data structure that has been constructed to associate particular operations with particular dataflow graph components. For example, if language within the program is identified by the parser as performing a merge between data, the data structure may identify a dataflow graph component that joins together flows of data records as corresponding to a merge operation. Such a parser may also, in some embodiments, determine an execution order of data operations as executed by the program. When generating a dataflow graph based on the program, flows between components representing the data operations may be generated and the components connected together via the flows in an order based on the determined execution order.

Following below are more detailed descriptions of various concepts related to, and embodiments of, techniques for automatically converting programs written in procedural languages into dataflow graphs. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative dataflow graph, according to some embodiments. Dataflow graph 100 is depicted in FIG. 1 to illustrate some of the above-described features of a dataflow graph. A dataflow graph is a program that can be represented as a visual flow of data records through components and flows. The components, as referred to herein, are parts of the dataflow graph that perform operations on data records, and the connections between the components are referred to herein as flows.

Generally speaking, a dataflow graph is produced through arranging components and flows within a graphical user interface. FIG. 1 illustrates an example of such a view of a dataflow graph, wherein the rectangular boxes components and the lines between then each represent a flow. Dataflow graphs are a convenient way to write programs that operate on data record because the flow of data can be visualized when viewing the dataflow graph. Once a dataflow is ready to be executed, it may be compiled then executed by a suitable computing system.

In the example of FIG. 1, three data inputs 102, 104 and 106 are accessed, manipulated and combined in a manner to be described below, to produce two data outputs 122 and 124. A data input may be provided from various sources, including from a file stored on a computer readable medium, from a collection of files, or from a database table. In the example of FIG. 1, the data inputs 102, 104 and 106 are depicted in a manner often used to depict single data files stored on a computer readable medium.

In the example of FIG. 1, input data 102 is read and operated on by filter component 108, which outputs data records that meet a particular logical expression. For example, if input data 102 included a data field specifying a country code, filter 108 might be configured to output only those data records that have a value of that data field of "US". Data records output from the filter 108 are input to sort component 110, which sorts the data records into an order dictated by a selected sort "key," which identifies one or more data fields according to which the records are to be ordered. The sorted data records are output to the join component 120.

In addition, input data 104 is read and operated on by transform component 112, which manipulates the input data records according to transform code stored within (or otherwise accessed by) the transform component 112. A transform may, for example, add or remove data fields for each data record and/or may manipulate values of data fields in producing output data. Note that, in the example of FIG. 1, the filter component 108 and the transform component 112 exhibit component parallelism. That is, data records from input data 102 may be operated on by the filter 108 at the same time as data records from input data 104 are operated on by the transform 112. The component parallelism may, in some cases, be exploited by executing the filter 108 and transform 112 components using different processors, and in some cases using different computing systems.

In the example of FIG. 1, join component 116 receives data records output from transform 112 and output from filter component 114 (which operates as discussed above in relation to filter 108). The join component may be configured to produce a single set of data records from two sets of data records by matching records from each set according to a key which identifies a data field from each set of input data records. Transform code stored within (or otherwise accessed by) the join component 116 may further dictate how to construct outgoing data records from the join component based on data field values contained within matching records from the two sets of input data records.

The data records output from the join component 116 are replicated to produce two identical sets of data records by replicate component 118. One of these sets of data records is stored as output data 124, whereas the other set is joined with the data records output from sort 110 and the result stored as output data 122.

In general, components in a dataflow graph are configured to some extent to define their function. In the case of the filter and transform components in the example of FIG. 1, for instance, the components are configured through transform code which dictates how the records are selected or transformed, respectively. In some cases, a transform component may also define an output record format that differs from the record format of input data records. The sort component may be configured by specifying a sort key and in some cases, by specifying how the sort is to be performed (e.g., ascending versus descending values). In each of these cases, some manner of configuration is applied to describe how the component should operate on data records. The data that describes such configuration may be collectively referred to herein as "configuration data." Transform code, key values, record formats, etc. are therefore each a type of configuration data. The replicate component in the example of FIG. 1 may, in at least some cases, function without defined configuration data because the component is designed only to replicate a data flow and may not be otherwise configurable.

Figure 2:
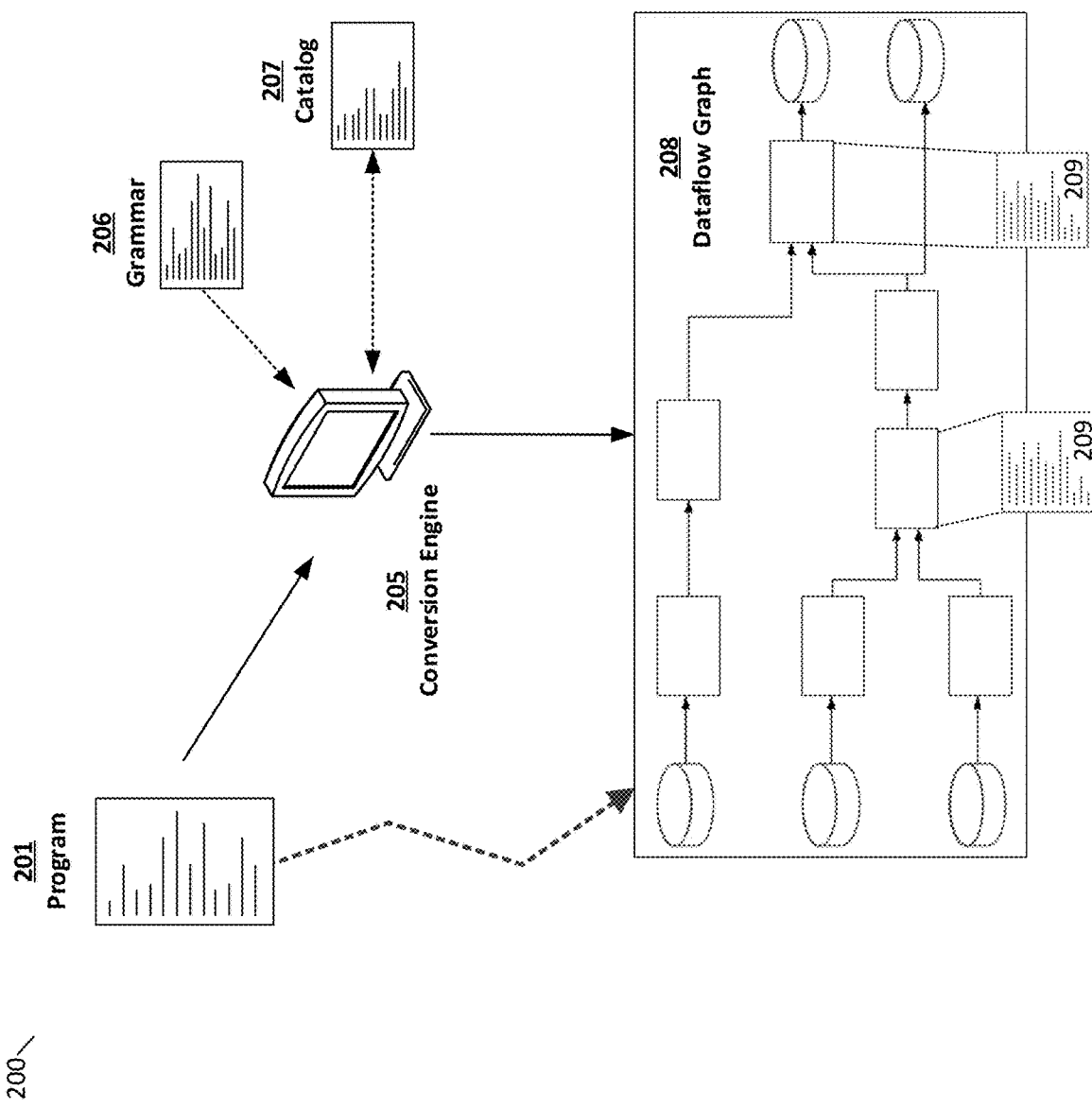
FIG. 2 depicts a flowchart of a method of automatically converting a program written in a procedural language into a dataflow graph, according to some embodiments.

FIG. 2 depicts a flowchart of a method of automatically converting a program written in a procedural language into a dataflow graph, according to some embodiments. As discussed above, according to some aspects of the present application, the functionality of a data processing system may be increased via a computer-executed tool that converts programs, written in a procedural language, into components that may be executed as a dataflow graph. Method 200 illustrates how such a tool may be operated to perform such a conversion by converting program 201 into dataflow graph 208.

In the example of FIG. 2, a program 201, which is written in a procedural language, is provided as input to a conversion engine 205, which comprises one or more computing devices executing the tool discussed above. The program 201 may be written in any procedural language, as the techniques described herein are not limited to any particular language. Examples of suitable languages include Statistical Analysis System (SAS), BASIC, Fortran, Java, Mathematica, MATLAB, Pascal, Perl, Python, R, Unix shell, and Visual Basic.

During execution by the conversion engine, the tool may utilize a predefined grammar 206. The grammar 206 may provide various definitions relied upon by the tool executed by the conversion engine 205 that allow the tool to parse the program 201 and generate the dataflow graph 208. These definitions provided by the grammar 206 may indicate to the tool how to interpret words and symbols within the program 201, how to identify data operations (or groups of data operations) within the program as having functionality corresponding to a particular type of dataflow graph component, how to generate dataflow graph components, how to identify data operations (or groups of data operations) within the program as relating to configuration data for an identified type of dataflow graph component, how to configure dataflow graph components that correspond to data operations within the program, and/or how to determine the control flow of data operations within the program.

As used herein, "control flow" refers to an order, consistent with the program, in which individual data operations are performed. For instance, a program may perform operations C, D, and E and may be configured such that operation C is performed before either of operation D or operation E. This dependency on the relative ordering of operations C, D, and E is one example of control flow.

In the example of FIG. 2, data produced by the tool parsing the program may be stored in catalog 207, which may comprise any suitable data structure in which aspects such as determined control flow relationships of data operations in the program may be stored. The catalog may be accessed by the conversion engine during subsequent parsing operations as described further below.

As referred to herein, a "data operation" for a program refers to a portion of the program that, when executed, modifies the execution environment of the program. Data operations may include, for instance, the modification of the value of one or more variables or other data that exist within the execution environment. It will be appreciated that the modification of a value may itself comprise one or more data operations. For instance, when a command in a procedural program sets the value of a variable to a value equal to the result of a calculation, each part of the calculation may represent a separate data operation, as does the end result of storing the calculated value in the variable. As such, in at least some cases, a single command of the program may represent multiple data operations because various changes to the execution environment occur during execution of the command.

According to some embodiments, the conversion engine 205 may generate one or more components and flows of a dataflow graph 208 as corresponding to a sequence of data operations within the program 201. In some cases, generating a component of dataflow graph 208 may include identifying a type of component from amongst a plurality of available dataflow graph components. In some cases, generating a component of dataflow graph 208 may also include generating configuration data for an identified component, which may comprise defining parameter or other configurable aspects of the component based on data operations within the program. For example, instances of illustrative dataflow graph transform code 209 shown in FIG. 2 may be generated by the tool executed by the conversion engine and associated with the identified component.

According to some embodiments, the tool executed by conversion engine 205 may generate flows between identified components of the dataflow graph 208 based on determined control flow relationships of data operations within the program. For instance, where the tool identifies first and second components for particular data operations (or sets of data operations), the tool may also identify that the data operation(s) associated with the first component occur earlier within the control flow than the data operation(s) associated with the second component. As a result, the tool may generate one or more flows connecting the first and second components so that the second component is executed downstream the dataflow graph from the first component (that is, data flows out of the first component earlier in the sequence of components than data flowing into the second component).

The net result of the process performed by the conversion engine 205, based on the grammar 206, is to generate the dataflow graph 208, which is a dataflow graph representation of the program 201. This relationship between a program and an equivalent dataflow graph is illustrated in FIG. 2, and in subsequent drawings, by a zig-zag arrow.

Figure 3:
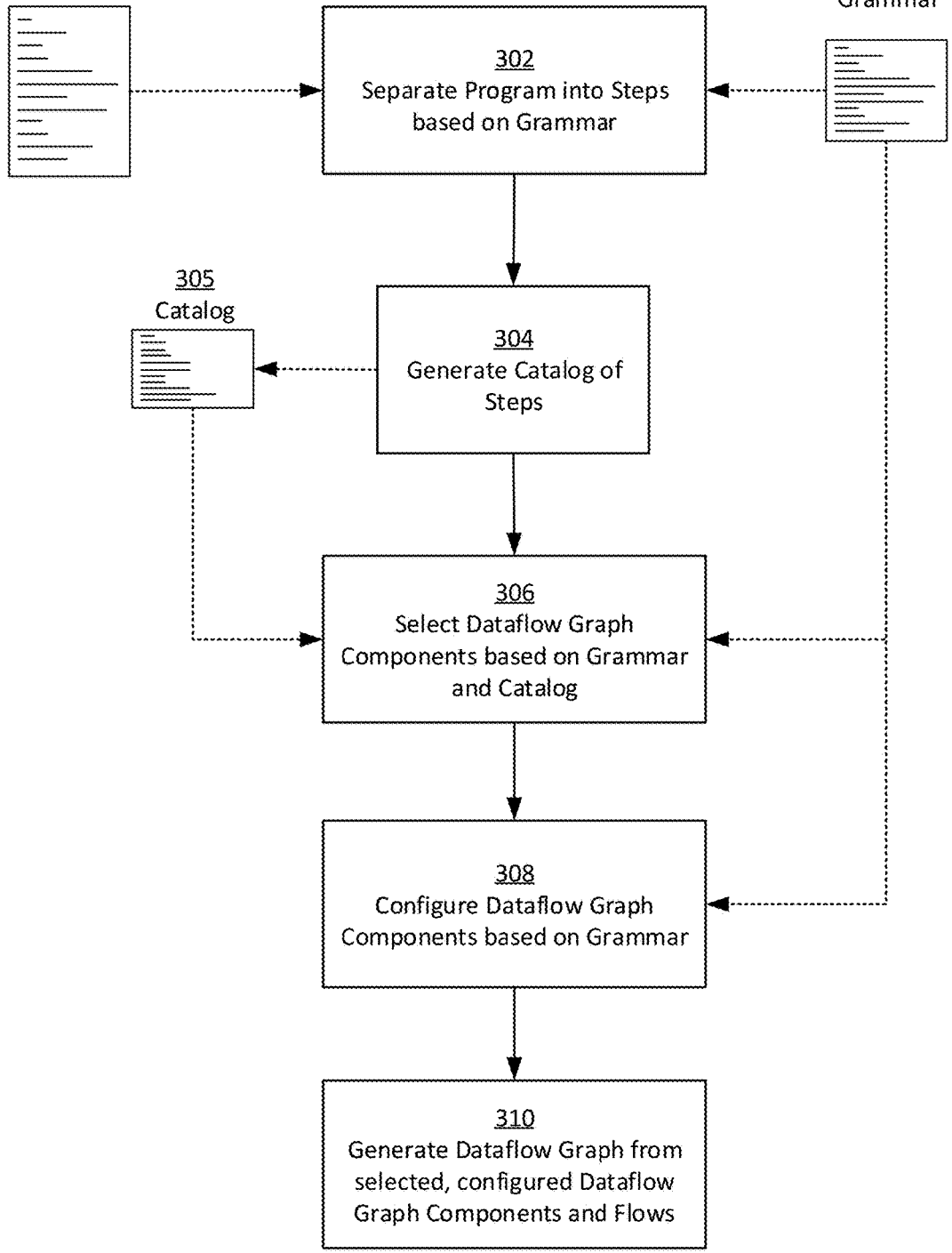
FIG. 3 is a flowchart of a method of automatically converting a program written in a procedural language into a dataflow graph, according to some embodiments.

FIG. 3 is a flowchart of a method of automatically converting a program written in a procedural language into a dataflow graph, according to some embodiments. Method 300 is an illustrative process in which a program 301 written in a procedural language is automatically converted into a dataflow graph. Method 300 may be performed, for example, by the tool executed by conversion engine 205 shown in FIG. 2 and discussed above.

Method 300 begins with act 302 in which the program 301 is separated into steps based on a grammar 303. A tool performing method 300 may rely, as with the example of grammar 206 in FIG. 2, on a grammar 303 to indicates, among other things, how to interpret words and symbols within a program and how to identify data operations (or groups of data operations) within the program as having functionality corresponding to a particular type of dataflow graph component. In particular, the tool may parse the program 301 using the grammar 303 to identify one or more data operations in act 302. Each group of one or more data operations may be termed a "step," so that the data operations of the program are separated into a sequence of steps wherein each step contains one or more data operations performed by the program.

In act 304, the tool executing method 300 may store or otherwise record information identifying the recognized steps in catalog 305. The catalog produced in act 304 may identify steps of the program and the control flow relationships of said steps, and may further identify the one or more data operations of the program 301 that correspond to each step.

In act 306, the tool executing method 300 selects types of dataflow graph components that correspond to the identified steps of the program (and which may have been stored in the catalog in act 304). The type of dataflow graph component selected may be based on parsing the data operations of an identified step using grammar 303 and determining, based on said parsing, which type of dataflow graph component corresponds to the data operations of the step. As discussed above, the grammar 303 may be configured to relate particular types of dataflow graph components to particular language within the program, so that a dataflow graph component that performs the same function as a step in which the language appears may be generated appropriately.

In some embodiments, a preconfigured library of dataflow graph component types may be available to the tool so that identifying a dataflow graph component comprises selecting one of the component types from said library (e.g., a component of type "sort" or of type "filter" as discussed in relation to FIG. 1). In some embodiments, an instance of a dataflow graph component of the selected component type may be generated that has a corresponding function as a step of the program.

In act 308, the tool executing method 300 may configure dataflow graph components selected in act 306. Act 308 may accordingly comprise generating configuration data for one or more of the components selected in act 306. The tool may access a grammar to determine how to configure a given dataflow graph component based on the data operations present in the corresponding step of the program. As discussed above, data that describes the configuration of a dataflow graph component is referred to herein as "configuration data." Act 308 may thereby comprise generating values for operational parameters of a component and/or generating transform code for a component. It may be appreciated that some of the components identified in act 306 may not require configuration data and, as a result, configuration data may not be generated for all of the identified components.

In act 310, the tool executing method 300 may generate a dataflow graph comprising the identified components configured, where applicable, by act 308 (e.g., comprising the generated configuration data), and with flows connecting the components in a sequence according to the identified control flow relationships of the steps of the program. In some embodiments, act 310 may comprise recording the already-identified and configured components along with generated flows connecting the components, to a suitable computer readable storage medium. For example, a dataflow graph may be stored as a data file that includes data describing or otherwise identifying dataflow graph components, flows and configuration data for the components, and act 310 may comprise recording said data file. In some embodiments, such a data file may be arranged so as to be compiled by another program before execution. In some embodiments, the generated dataflow graph may be produced as an executable data file, in which case act 310 may comprise a step of compiling the dataflow graph according to the identified dataflow graph components, flows and configuration data for the components. Act 310 may comprise generating flows so as to connect the dataflow graph components in an ordering according to the control flow relationships identified by the catalog.

According to some embodiments, program 301 may comprise one or more procedures (which may also be referred to as routines, functions, subroutines or macros) and the tool executing method 300 may identify such procedures when parsing the program using a grammar. For instance, the tool may identify one or more procedure calls and/or may recognize procedure definitions. In some embodiments, the tool executing method 300 may generate a reusable group of dataflow graph components, sometimes called a "subgraph," to represent the data operations of an identified procedure. In some cases, this subgraph may be stored in a data file that may be accessed by the generated dataflow graph. This may allow the generated dataflow graph to reuse the same set of components in a similar manner to how the program 301 may make repeated procedure calls and thereby reuse the same section of code. The subgraph may represent an entire identified step of the program, or may instead represent a portion of an identified step of the program.

In cases where the tool executing method 300 generates a subgraph to represent a procedure of program 301, the procedure may utilize one or more values as inputs to the procedure. In such cases, the generated subgraph may be parameterized so that the behavior of the dataflow graph components in the subgraph behave differently based on the value of the subgraph parameters. For instance, branches of components may be enabled or disabled within the subgraph based on the value of a component.

According to some embodiments, program 301 may comprise, or otherwise function based on, one or more global variables, which are values defined in the execution environment and that may alter the way in which data operations in the program are performed. In such cases, the tool executing method 300 may generate one or more dataflow graph parameters, which are parameters set at the dataflow graph level whose values may be accessed by one or more components of the dataflow graph to dictate the component's behavior. As an illustrative example, the program 301 may be written to initialize a global variable having a value of a country code and to perform subsequent processing of data dependent on said value. A generated dataflow graph may be defined with a graph parameter to define the country code and components of the dataflow graph may utilize this parameter definition in transform code or otherwise.

According to some embodiments, the tool executing method 300 may identify comments within program 301. Comments are sections of a program that are not executed and are typically identified using a delimiter at the beginning or the beginning and end of the comment section. In some cases, the tool executing method 300 may identify such comments within the program and copy those comments into relevant locations within the generated dataflow graph. Comments may, for instance, be identified by the tool as being related to particular data operations within the program based on proximity of the comment text to the data operations. Such comments may be placed within transform code of a component corresponding to those data operations such that any information within those comments may be preserved in the resulting dataflow graph.

According to some embodiments, the tool executing method 300 may identify and preserve whitespace within program 301 when generating the dataflow graph. As referred to herein, "whitespace" refers to any character or series of characters that represent horizontal or vertical space in typography within the program, the most common example being a "space" character. In some cases, the tool executing method 300 may identify such whitespace within a data operation of the program and preserve the presence of the whitespace when generating transform code (or other configuration data) for the data operation within a component of the dataflow graph.

Figure 4B:
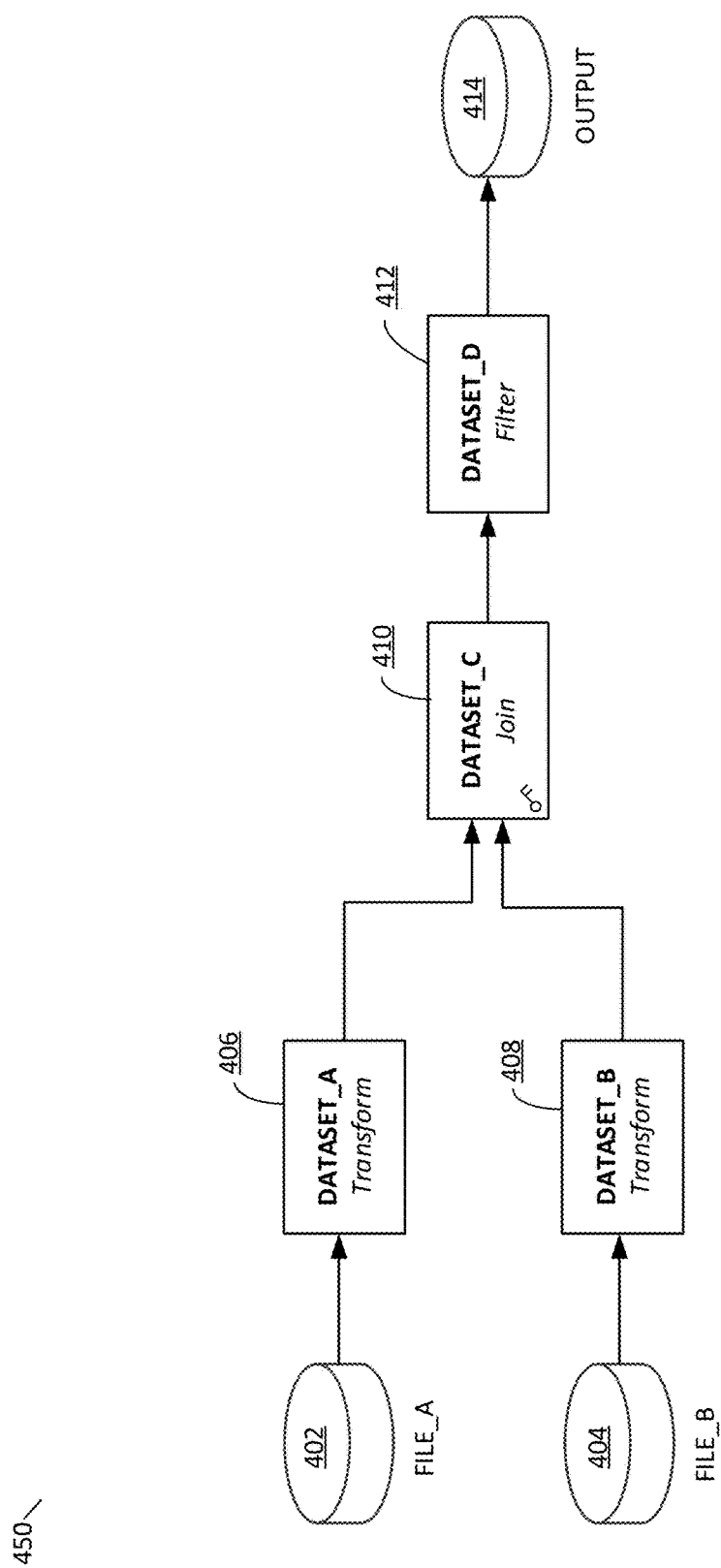
FIG. 4B depicts an illustrative dataflow graph generated according to the program shown in FIG. 4A, according to some embodiments.

FIGS. 4A-4F provide an illustrative example of converting a program written in the procedural language SAS into a dataflow graph, according to some embodiments. FIG. 4A depicts an illustrative SAS program, which performs a series of operations on two input data files and produces an output data file. As discussed above, a computer-executed tool may be executed to convert the illustrated program into components that may be executed as a dataflow graph.

According to some embodiments, when executed and provided program 400 as input, the tool may identify four steps of the program, labeled 401a, 401b, 401c and 401d. As discussed above in relation to act 302 of FIG. 3, a tool may access a grammar to identify data operations or groups of data operations that correspond to steps of the program. In the illustrative program 400, these steps are configured to perform the following actions. Step 401a reads a data file called "FILE_A", parses its contents into three data fields and creates an additional data field (ORDER_FULL_NAME) from the contents of the three data fields. Step 401b reads a data file called "FILE_B", parses its contents into three data fields and creates an additional data field (ORDER_FULL_NAME) from the contents of the three data fields. Step 401c merges the results of steps 401a and 401b. Step 401d filters out any data records that do not have a particular value ("US") in the first two characters of the ORDER_FULL_NAME data field.

According to some embodiments, the tool being executed may identify the contents of these portions of the program 400 as corresponding to operations that may be performed by components of a dataflow graph. In particular, the tool may recognize the contents of the portions of code labeled 401a and 401b as each performing a transformation of a read data file. Further, the tool may recognize the contents of the portion of code labeled 401c as performing a join operation, and the contents of the portion of code labeled 401d as performing a filter operation. Moreover, the tool may identify control flow relationships of these steps by recognizing that step 401c utilizes the result of steps 401a and 401b ("MERGE DATASET_A DATASET_B") and that step 401d utilizes the result of step 401c ("SET DATASET_C"). As a result, the components and flows shown in FIG. 4B may be identified. The tool may also generate suitable configuration data for components 406, 408, 410 and 412. As a final step, the tool may then produce a dataflow graph arranged as shown in FIG. 4B and that includes the generated configuration data.

Figure 4C:
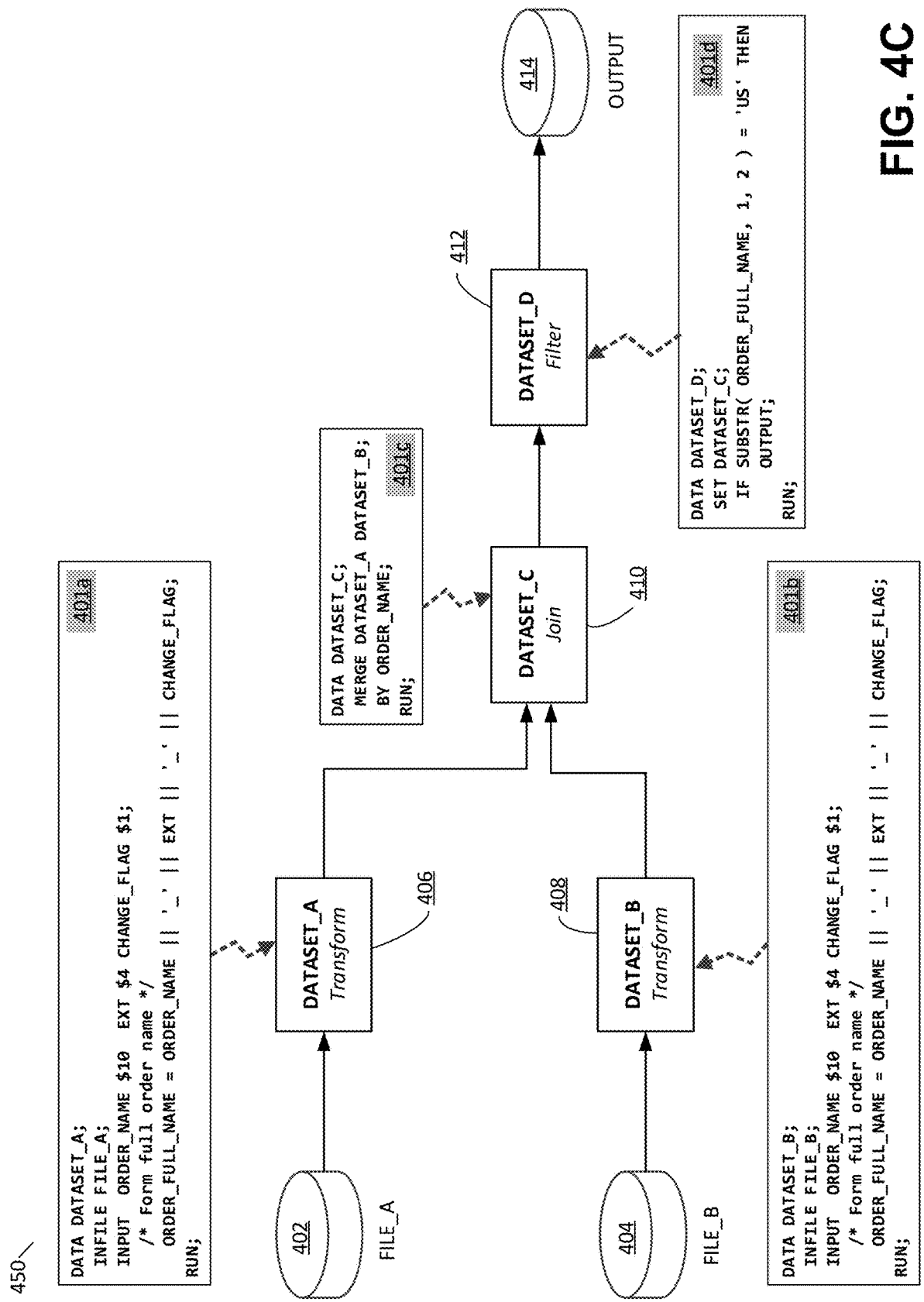
FIG. 4C depicts the illustrative dataflow graph of FIG. 4B with dataflow graph components annotated with corresponding steps of the SAS program, according to some embodiments.

FIG. 4C illustrates FIG. 4B with annotations associated with components 406, 408, 410 and 412 that show respective steps of the program 400 shown in FIG. 4A. Procedural language code that is equivalent to a component of the dataflow graph 450 is shown connected to said component in FIG. 4C with a gray zig-zag arrow. It will be appreciated, therefore, that the annotated sections of program 400 are not verbatim stored by or otherwise executed by respective components in dataflow graph 450. Rather, the components of the dataflow graph 450 perform functionality that is equivalent to the associated sections of the program.

Figure 4D:
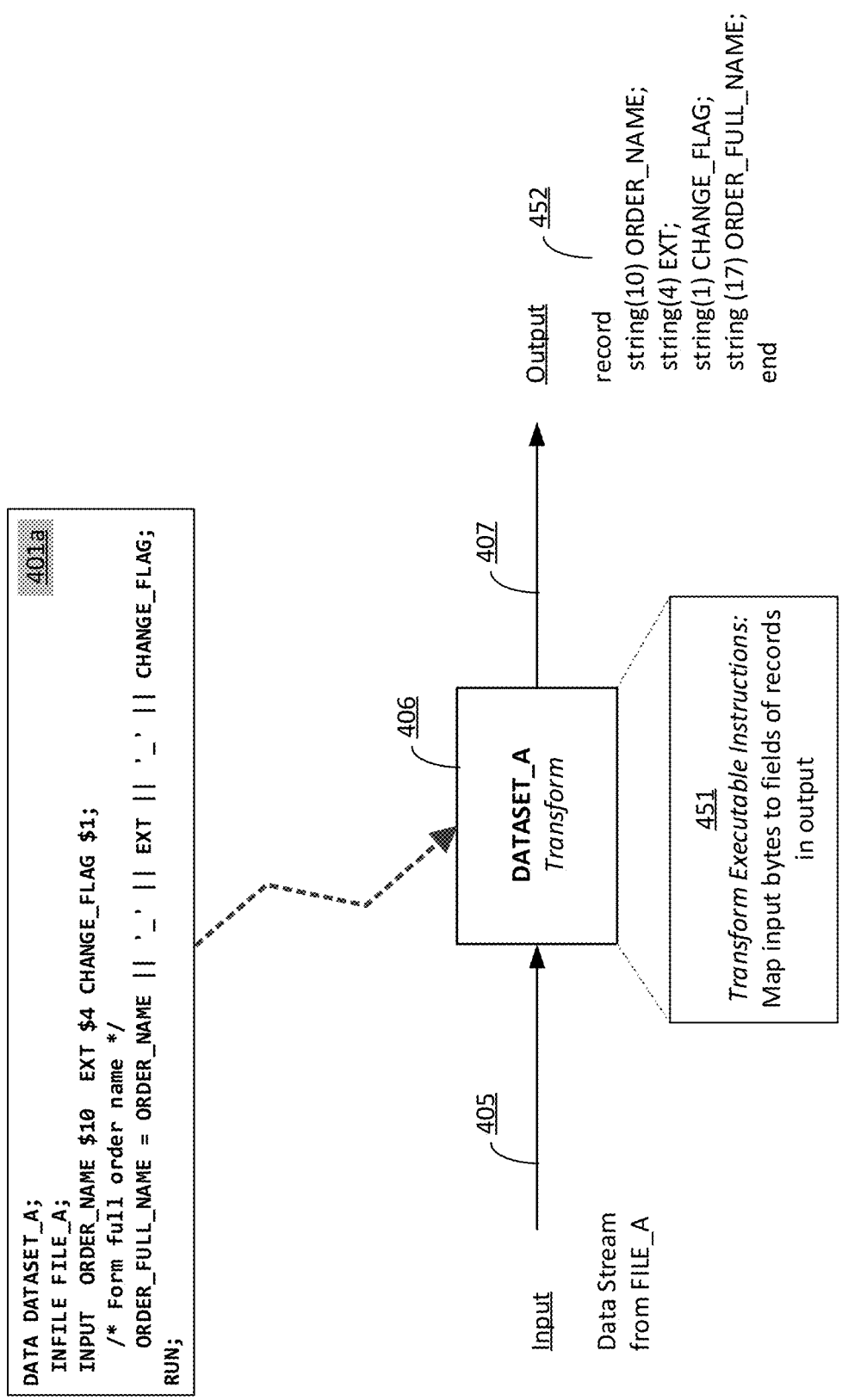
FIG. 4D illustrates details of converting a first step of the program shown in FIG. 4A into a first component of the dataflow graph shown in FIG. 4B, according to some embodiments.

FIG. 4D illustrates details of converting a first step of the program shown in FIG. 4A into a first component of the dataflow graph shown in FIGS. 4B-4C, according to some embodiments. To further illustrate the process of configuring a component by generating configuration data for the component by the tool, FIG. 4D shows step 401a from FIG. 4A, and illustrates how the resulting section of a dataflow graph may be generated.

In the example of FIG. 4D, a flow 405 is generated to connect the identified transform component 406 to the input file FILE_A, as a result of the data operation "INFILE FILE_A" in the section 401a of the program, which indicates that the program is to read FILE_A. In addition, the transform component 406 is configured to read a sequence of bytes from the input file as dictated by the program's data operation "INPUT ORDER_NAME $10 EXT $4 CHANGE_FLAG $1," which indicates that ten bytes are to be read as a value for the data field ORDER_NAME, the next four bytes are to be read as a value for the data field EXT, and the next byte is to be read as a value for the data field CHANGE_FLAG. The component 406 may be configured to continue to read bytes from the input FILE_A, assuming there are additional bytes; in this manner, each block of 15 bytes in the input file becomes a portion of successive data records.

In addition, the component 406 is configured with transform code 451 to generate an additional output data field by concatenating the three field values read from the input file with underscore characters as dictated by the data operation defining ORDER_FULL_NAME in the program section 401a. The component 406 may be configured to produce data records on flow 407 according to the illustrated output record format 452. The tool generating the dataflow graph may generate the record format 452 by interpreting the program section 401a using a grammar, to identify the types and lengths of the data fields being produced by this step of the program. In this case, the lengths of the ORDER_NAME, EXT and CHANGE_FLAG fields may be inferred from the manner in which they are read from the input file, and the length of the ORDER_FULL_NAME field may be inferred as a result of concatenating the 15 total characters of the three other fields with two underscore characters.

Figure 4E:
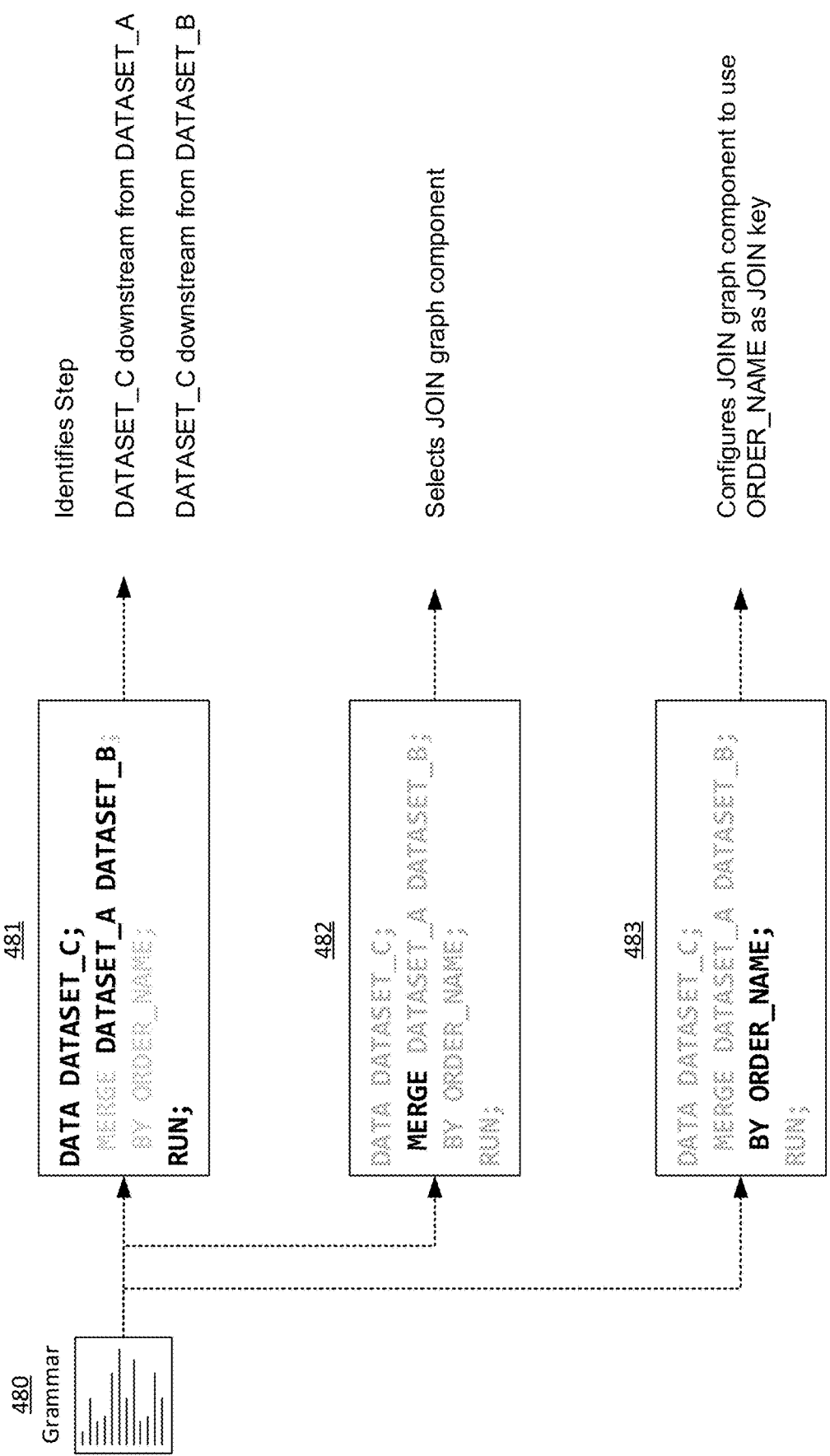
FIG. 4E illustrates an example of parsing a step of the program shown in FIG. 4A with a grammar to identify the step and control flow relationships between the step and other steps, select a corresponding dataflow graph component, and configure the selected dataflow graph component, according to some embodiments.
Figure 4F:
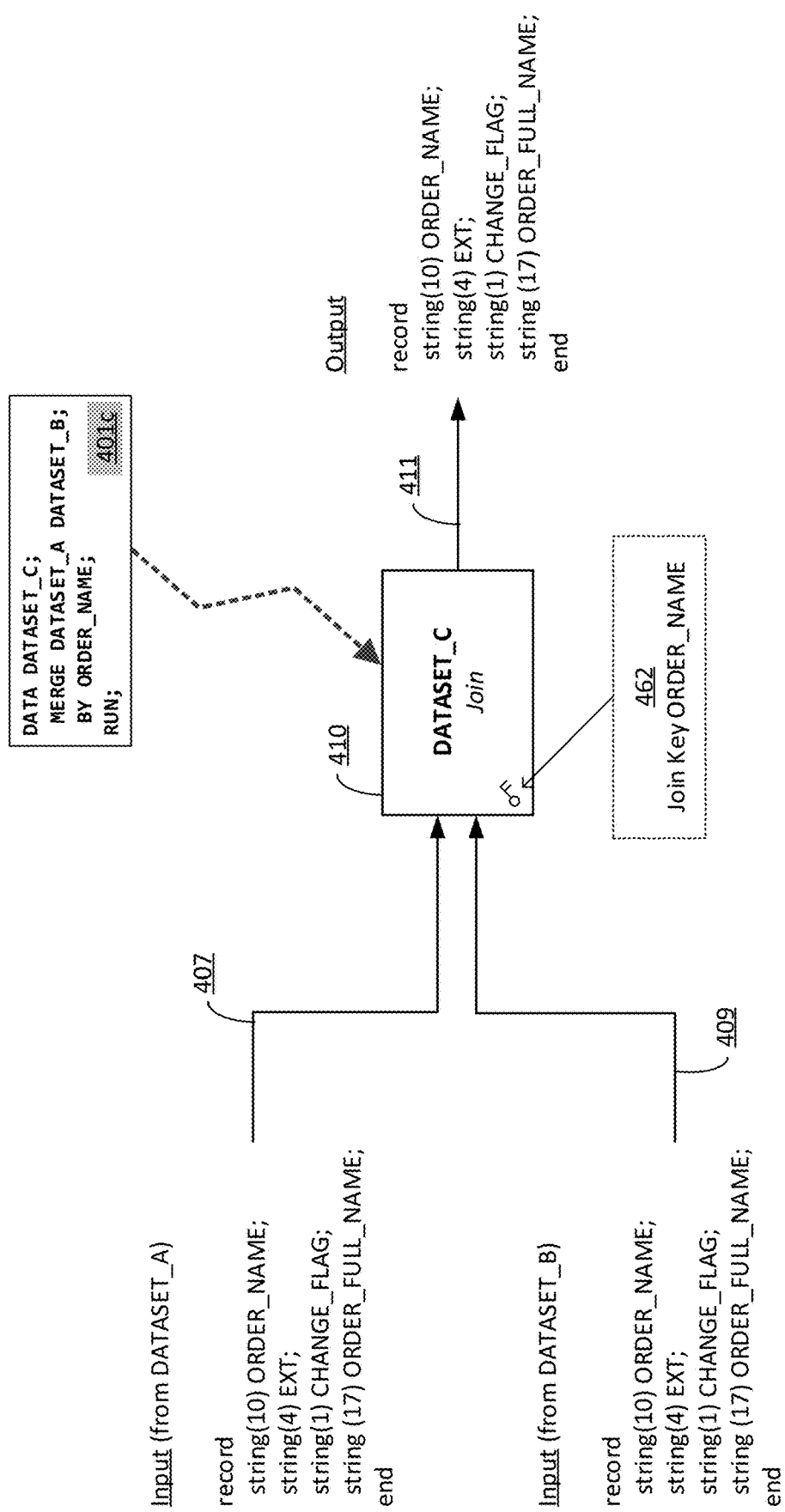
FIG. 4F illustrates details of converting a second step of the program shown in FIG. 4A into a second component of the dataflow graph shown in FIG. 4B, according to some embodiments.

FIGS. 4E-4F illustrate details of converting a second step of the program shown in FIG. 4A into a second component of the dataflow graph shown in FIGS. 4B-4C, according to some embodiments. FIG. 4E reproduces the content of step 401c from FIG. 4A and depicts three different parsing operations of the step using a grammar 480.

In a first instance in FIG. 4E, the illustrated data operations of the program 481 are parsed using grammar 480 to identity these data operations as a step, namely step 401c described above. The tool may recognize, using the grammar 480, the data operations 481 as corresponding to the step based on the highlighted language that: a) identifies the data operations beginning with "DATA.." and ending with " . . . RUN;" as defining a step; and b) recognizes that the step depends on "DATASET_A" and "DATASET_B" and that this therefore implicates a particular control flow relationship between this step and other portions of the program.

In a second instance in FIG. 4E, the tool may parse the illustrated data operations of the program 482 (which may now have been identified as corresponding to a step 401c) using the grammar 480 to determine a type of dataflow graph component that corresponds to the function of the step in the program. In the example of FIG. 4E, the highlighted keyword "MERGE" may be identified using the grammar as corresponding to a dataflow graph component of the "JOIN" type.

In a third instance in FIG. 4E, the tool may parse the illustrated data operations of the program 482 (which may now have been identified as corresponding to a step 401c) using the grammar 480 to determine how to configure an instance of the type of dataflow graph component selected in the second instance of parsing described above. In the example of FIG. 4E, the highlighted language "BY ORDER NAME;" may be identified using the grammar as indicating that the instance of the "JOIN" dataflow graph component should be configured to use a field called "ORDER NAME" as a key field for the join operation.

Accordingly, FIG. 4E provides one example of how a grammar 480 may produce these three different types of information regarding a portion of a program through parsing of that portion. While the parsing is described above in terms of three separate instances of parsing, it will be appreciated that the tool may utilize grammar 480 to parse the portion of the program in any number of ways that each parse any suitable parts of the portion of the program in any order, and that the above is provided merely as an illustrative process.

In view of the above-described parsing of step 401c, FIG. 4F illustrates how the resulting section of a dataflow graph may be generated. In the example of FIG. 4F, flows 407 and 409 provide data records having the illustrated input record formats from the two upstream transform components 406 and 408. In parsing the step 401c of the program, the tool may identify that a join component is appropriate as a result of the "MERGE" command in the program, and may further generate configuration data for the join component that specify a join key 462 of ORDER_NAME as a field to use to match up incoming records for the join. As a result of the join, the only records that may be output from component 410 along flow 411 may be those for which there were records with the same ORDER_NAME value present in both of the incoming sets of data records from the transform components.

Figure 5:
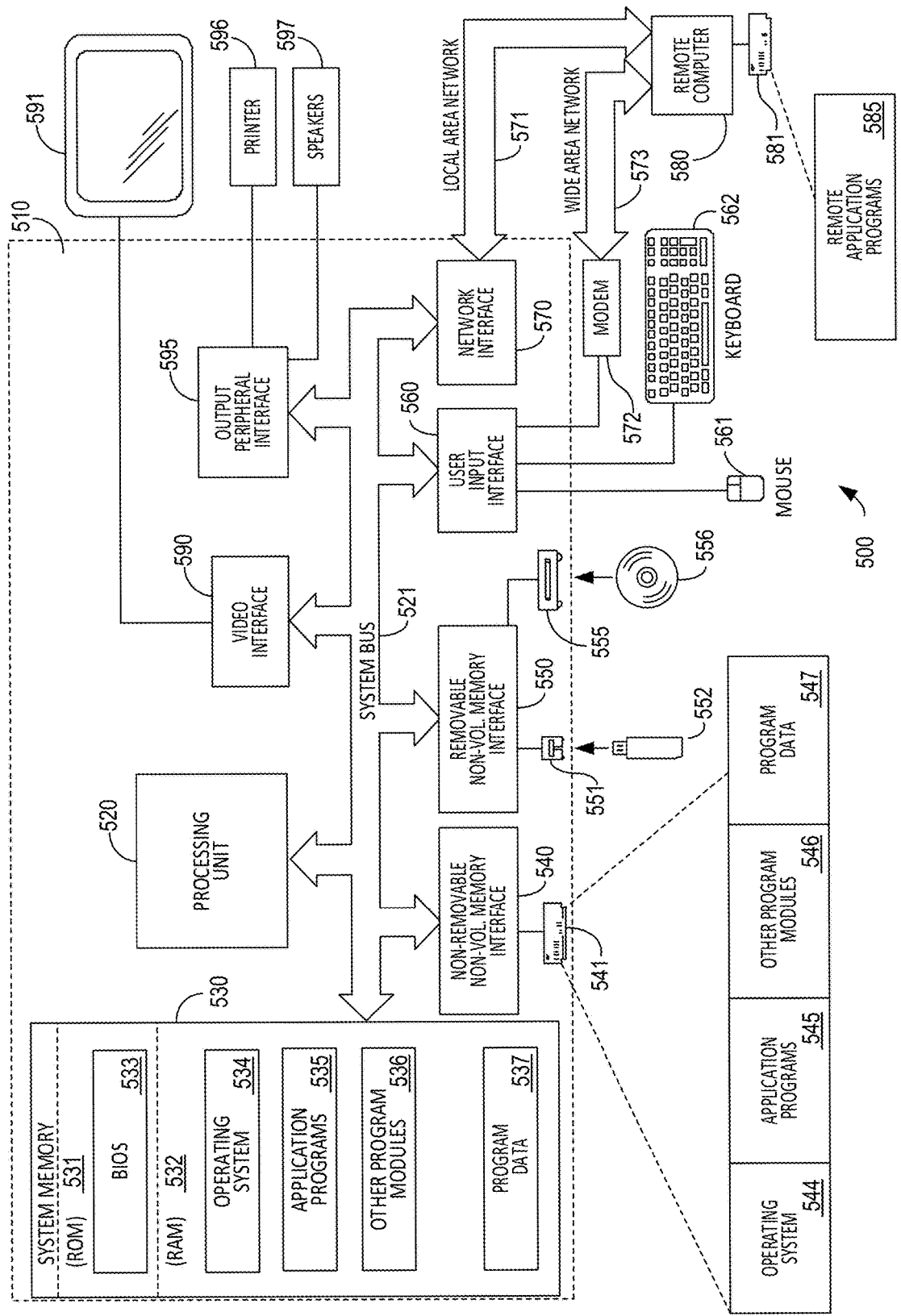
FIG. 5 illustrates an example of a computing system environment on which aspects of the invention may be implemented.

FIG. 5 illustrates an example of a suitable computing system environment 500 on which the technology described herein may be implemented. The computing system environment 500 is only one example of a suitable computing environment and is not intended to suggest any limitation as to the scope of use or functionality of the technology described herein. Neither should the computing environment 500 be interpreted as having any dependency or requirement relating to any one or combination of components illustrated in the exemplary operating environment 500.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the technology described herein includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a flash drive 551 that reads from or writes to a removable, nonvolatile memory 552 such as flash memory, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one non-transitory computer readable medium comprising instructions that, when executed by at least one processor, perform a method of converting a program written in a first programming language into a dataflow graph, wherein the program comprises data operations and a control flow indicating a sequence of execution of the data operations, the method comprising:
   analyzing the program using the at least one processor and using a grammar stored by the at least one computer readable medium, wherein the grammar indicates: how to identify data operations within programs written in the first programming language, how to identify dataflow graph components corresponding to data operations within programs written in the first programming language, and how to configure dataflow graph components that correspond to data operations within programs written in the first programming language, said analyzing comprising:
   identifying, based on the grammar indicating how to identify data operations within the program, a plurality of sequential steps of the program, wherein each step of the plurality of steps comprises one or more data operations of the program;
   generating a catalog storing control flow relationships between steps of the plurality of identified steps of the program;
   for each of the identified plurality of steps of the program, based on data operations of the step and based on the grammar identifying one of a plurality of dataflow graph component types as corresponding to the step, identifying a plurality of dataflow graph components each corresponding to a respective step of the plurality of steps of the program; and configuring the plurality of dataflow graph components based on respective corresponding steps of the plurality of steps of the program and based on the grammar indicating how to configure the plurality of dataflow graph components, thereby producing a plurality of configured dataflow graph components, wherein configuring the plurality of dataflow graph components comprises generating configuration data for at least one of the plurality of dataflow graph components and associating the configuration data with the at least one dataflow graph component; and generating, using the at least one processor, a dataflow graph comprising: the plurality of configured dataflow graph components; and one or more flows representing flows of data records between the one or more dataflow graph components, wherein the one or more dataflow graph components are connected via the one or more flows in an order according to the generated catalog.

2. The non-transitory computer readable medium of claim 1, wherein the program is a Statistical Analysis System (SAS) program.

3. The non-transitory computer readable medium of claim 1, wherein analyzing the program further comprises identifying a macro defined in the program, and wherein configuring the plurality of dataflow graph components further comprises generating at least one parameter set based on the macro definition.

4. The non-transitory computer readable medium of claim 1, wherein the program comprises comments and wherein configuring the plurality of dataflow graph components comprises configuring at least some of the plurality of dataflow graph component to include the comments.

5. The non-transitory computer readable medium of claim 1, wherein the generated dataflow graph comprises first and second groups of dataflow graph components configured to execute in parallel with one another.

6. The non-transitory computer readable medium of claim 5, wherein:
the program comprises a first group of one or more of the plurality of data operations and a second group of one or more of the plurality of data operations,
the first group of data operations and the second group of data operations have no dependency on one another,
the first group of dataflow graph components performs the first group of data operations, and
the second group of dataflow graph components performs the second group of data operations.

7. The non-transitory computer readable medium of claim 1, wherein the program comprises whitespace between symbols of the program and wherein configuring the plurality of dataflow graph components preserves whitespace between portions of generated instructions corresponding to the symbols.

8. The non-transitory computer readable medium of claim 1, wherein analyzing the program further comprises identifying a subroutine defined in the program, and wherein the method further comprises generating at least one subgraph based on the subroutine definition.

9. The non-transitory computer readable medium of claim 8, wherein the subroutine is defined with one or more input values whose values alter the executable behavior of the subroutine, and wherein the generated at least one subgraph is generated with at least one subgraph parameter corresponding to the one or more input values of the subroutine.

10. The non-transitory computer readable medium of claim 1, wherein each step of the plurality of steps comprises a plurality of data operations of the program.

11. A computer-implemented method of automatically converting a program written in a first programming language into a dataflow graph, wherein the program comprises data operations and a control flow indicating a sequence of execution of the data operations, the method comprising:
analyzing the program using at least one processor and using a grammar stored by at least one computer readable medium, wherein the grammar indicates: how to identify data operations within programs written in the first programming language, how to identify dataflow graph components corresponding to data operations within programs written in the first programming language, and how to configure dataflow graph components that correspond to data operations within programs written in the first programming language, said analyzing comprising:
identifying, based on the grammar indicating how to identify data operations within the program, a plurality of sequential steps of the program, wherein each step of the plurality of steps comprises one or more data operations of the program;
generating a catalog storing control flow relationships between steps of the plurality of identified steps of the program;
for each of the identified plurality of steps of the program; based on data operations of the step and based on the grammar identifying one of a plurality of dataflow graph component types as corresponding to the step, identifying a plurality of dataflow graph components each corresponding to a respective step of the plurality of steps of the program; and
configuring the plurality of dataflow graph components based on respective corresponding steps of the plurality of steps of the program and based on the grammar indicating how to configure the plurality of dataflow graph components, thereby producing a plurality of configured dataflow graph components, wherein configuring the plurality of dataflow graph components comprises generating configuration data for at least one of the plurality of dataflow graph components and associating the configuration data with the at least one dataflow graph component; and generating, using the at least one processor, a dataflow graph comprising: the plurality of configured dataflow graph components; and one or more flows representing flows of data records between the one or more dataflow graph components, wherein the one or more dataflow graph components are connected via the one or more flows in an order according to the generated catalog.

12. The method of claim 11, wherein the program is a Statistical Analysis System (SAS) program.

13. The method of claim 11, wherein analyzing the program further comprises identifying a macro defined in the program, and wherein configuring the plurality of dataflow graph components further comprises generating at least one parameter set based on the macro definition.

14. The method of claim 11, wherein the program comprises comments and wherein configuring the plurality of dataflow graph components comprises configuring at least some of the plurality of dataflow graph component to include the comments.

15. The method of claim 11, wherein the generated dataflow graph comprises first and second groups of dataflow graph components configured to execute in parallel with one another.

16. The method of claim 15, wherein:
the program comprises a first group of one or more of the plurality of data operations and a second group of one or more of the plurality of data operations,
the first group of data operations and the second group of data operations have no dependency on one another,
the first group of dataflow graph components performs the first group of data operations, and
the second group of dataflow graph components performs the second group of data operations.

17. The method of claim 11, wherein the program comprises whitespace between symbols of the program and wherein configuring the plurality of dataflow graph components preserves whitespace between portions of generated instructions corresponding to the symbols.

18. The method of claim 11, wherein analyzing the program further comprises identifying a subroutine defined in the program, and wherein the method further comprises generating at least one subgraph based on the subroutine definition.

19. The method of claim 18, wherein the subroutine is defined with one or more input values whose values alter the executable behavior of the subroutine, and wherein the generated at least one subgraph is generated with at least one subgraph parameter corresponding to the one or more input values of the subroutine.

20. The method of claim 11, wherein each step of the plurality of steps comprises a plurality of data operations of the program.

21. A system for automatically converting a program written in a first programming language into a dataflow graph, wherein the program comprises data operations and a control flow indicating a sequence of execution of the data operations; the system comprising:
means for analyzing the program using at least one processor and using a grammar stored by at least one computer readable medium, wherein the grammar indicates: how to identify data operations within programs written in the first programming language, how to identify dataflow graph components corresponding to data operations within programs written in the first programming language, and how to configure dataflow graph components that correspond to data operations within programs written in the first programming language, said analyzing comprising:
identifying, based on the grammar indicating how to identify data operations within the program, a plurality of sequential steps of the program, wherein each step of the plurality of steps comprises one or more data operations of the program;
generating a catalog storing control flow relationships between steps of the plurality of identified steps of the program;
for each of the identified plurality of steps of the program, based on data operations of the step and based on the grammar identifying one of a plurality of dataflow graph component types as corresponding to the step, identifying a plurality of dataflow graph components each corresponding to a respective step of the plurality of steps of the program; and
configuring the plurality of dataflow graph components based on respective corresponding steps of the plurality of steps of the program and based on the grammar indicating how to configure the plurality of dataflow graph components, thereby producing a plurality of configured dataflow graph components, wherein configuring the plurality of dataflow graph components comprises generating configuration data for at least one of the plurality of dataflow graph components and associating the configuration data with the at least one dataflow graph component; and means for generating a dataflow graph, the dataflow graph comprising: the plurality of configured dataflow graph components; and one or more flows representing flows of data records between the one or more dataflow graph components, wherein the one or more dataflow graph components are connected via the one or more flows in an order according to the generated catalog.

* * * * *